D. Matthew,
Spark Arrester,
No. 357, Reissued Mar. 4, 1856
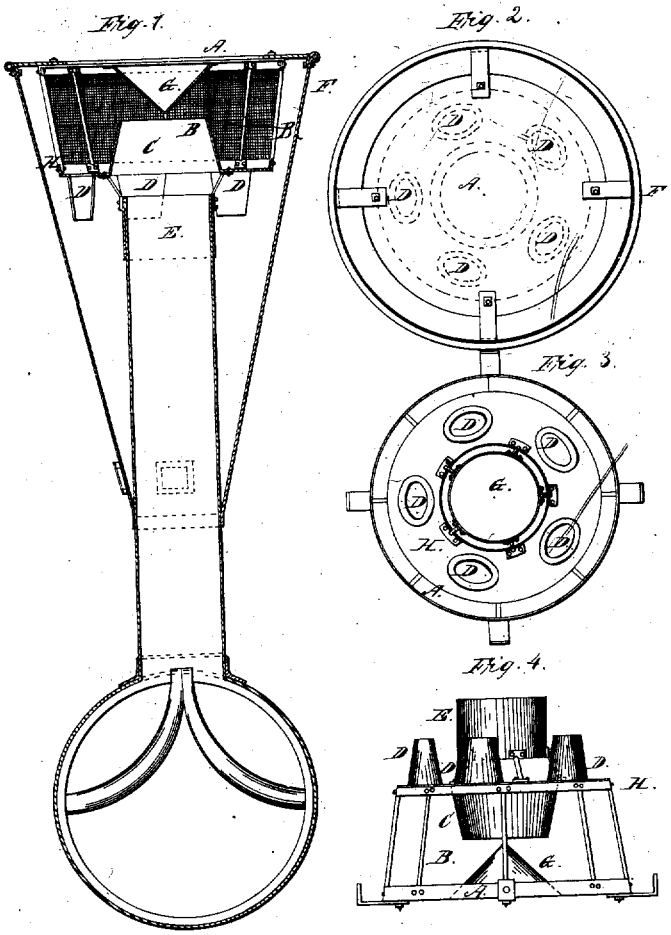
N. PETERS, PHOTO-LITHOGRAPHER, WASHINGTON, D. C.

UNITED STATES PATENT OFFICE.

DAVID MATTHEW, OF PHILADELPHIA, PENNSYLVANIA.

IMPROVEMENT IN SPARK-ARRESTERS.

Specification forming part of Letters Patent No. 1,920, dated December 31, 1840; extended December 27, 1854; Reissue No. 357, dated March 4, 1856.

*To all whom it may concern:*

Be it known that I, DAVID MATTHEW, of the city of Philadelphia, Pennsylvania, formerly of the city and county of Schenectady and State of New York, have invented a new and useful machine to be used upon locomotive steam-engines to catch sparks and cinders and cause draft to generate steam; and I do hereby declare that the following is a full, clear, and exact description of the construction and operation of the same, reference being had to the annexed drawings, making a part of this specification, in which—

Figure 1 is a view of the cross-section. Fig. 2 is a top view, Fig. 3 a bottom view, and Fig. 4 a side view, of the said improvement.

The nature of my invention consists in deflecting the steam, gases, and sparks which pass out of the top of the chimney downward in a larger area or space than the chimney, to deposit the sparks, and allow the expanded steam and gases to gently filter or pass through wire-gauze separated from the sparks and inside of an outer casing, which protects them from the condensing and counteracting influences of the atmosphere; also, in causing the chimney to assist the draft by inducing a current to flow through a sectional opening into the chimney between the exhaust-pipes and the extreme upper end of the chimney. The top of this spark-catcher A, Fig. 2, is a plate of iron about thirty-five inches in diameter, and has a cone, G, upon the lower or under side, (see G, Fig. 1,) sixteen inches in diameter, pointing downward, the point opposite the center of the plate, and standing at an angle of forty-five degrees from the plate A to the point. Around the edge of plate A is a flange two and a half inches wide, turned downward, forming a deflecting-head. Below this, and about fourteen inches from plate A, is another plate, H, connected to plate A by means of eight round iron braces of about three-eighths of an inch diameter, with feet riveted to the flange of plate A and to plate H. Five of these braces between plates A and H are seen in Fig. 4. This bottom plate, H, is about thirty-one inches in diameter, with a hole in the center sixteen inches in diameter. A funnel-mouth chimney-section, C, Figs. 1 and 4, nine inches long, fourteen inches in diameter at the top, coming up about as high as the lowest point of cone G, is riveted or secured to this plate. The base of this chimney-section is sixteen inches in diameter, is also stayed to the lower section, E, of the chimney, forming an annular space between its base and the lower section. There are also five other holes through plate H, of an oval shape, about seven inches by four, into which pass taper pipes about eight inches long below, and tapered down to about five by three inches around the outside of chimney E, and are riveted to plate H. These pipes are marked in the figures letter D. Around the spark-catcher, and between the plates A and H, is a wire-gauze, sewed to the flanges of plates A and H, in which are small holes made for the purpose, or may be fastened by means of hoops. This gauze is fourteen and a half inches wide, and presents a surface of about one thousand four hundred superficial inches, through which the smoke, steam, and air pass. On the outside of chimney or smoke-pipe E is an outer casing, F, of sheet-iron, rising in the form of a cone, reversed, about twenty-five inches above chimney E. The spark-catcher is kept firm by four braces extending from the top plate, A, (see Fig. 3,) to the outer casing, F, and are bolted to it. Between the top of the section E of the chimney and the base of the section C there is the annular space of three inches. A pipe of proper length as a support to hold steadily, to which the braces from section C are attached, is fitted over the outside of section E like the joint of a stove-pipe.

When the engine is at work, the exhaust-steam is discharged up the lower section of the chimney, and passes through the upper section, and with it the smoke, gases, and sparks or cinders are forced against the cone and deflecting-head A, by which their velocity is checked, and they are deflected downward. The steam and gases expanding and gently filtering through the wire-gauze, protected by the outer case from condensation and resistance of the colder atmosphere, pass out into the open air, and the sparks continue their descent into the lower part of the reservoir formed by the outer case sourrounding the chimney. The funnel-mouth or sectional pipe C being so much larger than pipe E, forming the annular space, when the engine exhausts, the smoke, steam, and air are displaced out of pipe C with the same velocity that they pass out of pipe E, and causes a current to flow upward through the annular space, and prevents any reaction of the draft from taking place between the pulsations or discharges of the exhaust; also, when the engine is standing or firing up, this annular space forms a free escapement for the natural draft. The experiments with this improvement show that in working the engine up to its proper power with pine wood about three bushels of sparks and cinders accumulated per hour.

What I claim is—

1. The combination of the cone and deflecting-head with the wire-gauze inside of the outer case to deflect the steam, gases, and sparks downward, retain the sparks, and allow the expanded steam and gases gently to escape through the gauze.

2. Forming the chimney of sections, with the base of the upper section, C, enlarged beyond the diameter of the top of the section E below it, substantially as described.

DAVID MATTHEW.

Witnesses:

CHARLES D. FREEMAN,

JOS. ENGARD.